United States Patent
Fairgrieve et al.

(10) Patent No.: US 11,738,758 B2
(45) Date of Patent: *Aug. 29, 2023

(54) APPARATUS AND METHOD FOR MONITORING VEHICLE OPERATION

(71) Applicant: JAGUAR LAND ROVER LIMITED, Coventry (GB)

(72) Inventors: Andrew Fairgrieve, Rugby (GB); Paul King, Loughborough (GB); Rebecca Matthias, Coventry (GB); John Simlett, Coventry (GB); Nicolas Iacovou, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/893,115

(22) Filed: Aug. 22, 2022

(65) Prior Publication Data

US 2022/0396272 A1 Dec. 15, 2022

Related U.S. Application Data

(63) Continuation of application No. 17/278,264, filed as application No. PCT/EP2019/072523 on Aug. 22, 2019, now Pat. No. 11,420,637.

(30) Foreign Application Priority Data

Sep. 19, 2018 (GB) ...................................... 1815230

(51) Int. Cl.
*B60W 40/08* (2012.01)
*B60W 60/00* (2020.01)
(Continued)

(52) U.S. Cl.
CPC ............ *B60W 40/08* (2013.01); *B60W 50/16* (2013.01); *B60W 60/0015* (2020.02);
(Continued)

(58) Field of Classification Search
CPC .. B60W 40/08; B60W 50/16; B60W 60/0015; B60W 2040/0818;
(Continued)

(56) References Cited

U.S. PATENT DOCUMENTS 9,373,203 B1 6/2016 Fields et al.
9,475,389 B1 10/2016 Fung et al.
(Continued)

FOREIGN PATENT DOCUMENTS

| | | |
|---|---|---|
| DE | 102015201369 A1 | 7/2016 |
| EP | 3348453 A1 | 7/2018 |
| WO | 2018113857 A1 | 6/2018 |

OTHER PUBLICATIONS

International Search Report corresponding to International Application No. PCT/EP2019/072523, dated Feb. 6, 2020, 6 pages.
(Continued)

*Primary Examiner* — Mohamed Barakat
(74) *Attorney, Agent, or Firm* — Reising Ethington P.C.

(57) ABSTRACT

Embodiments of the present invention provide a control system for a vehicle, the vehicle (800) being operable in an at least partly autonomous mode and a manual mode, the control system comprising input means (291, 292) for receiving a gaze signal (211) indicative of a direction of a gaze of an occupant of the vehicle (800), and a contact signal (212) indicative of physical contact between the occupant and a control of the vehicle, control means (250, 260, 270, 280, 290) configured to determine an estimate of the occupant's attention to a driving task in the at least partly autonomous mode in dependence on the gaze signal (211)

(Continued)

and to determine when the occupant is at least partly obscured relative to the at least one imaging means (150, 220), wherein the control means (250, 260, 270, 280, 290) is configured to determine the estimate of the occupant's attention to the driving task in dependence on the contact signal when it is determined that the occupant is at least partly obscured.

20 Claims, 7 Drawing Sheets

(51) Int. Cl.
*B60W 50/16* (2020.01)
*G06V 20/59* (2022.01)
*B60W 50/14* (2020.01)

(52) U.S. Cl.
CPC ... *G06V 20/597* (2022.01); *B60W 2040/0818* (2013.01); *B60W 2050/143* (2013.01); *B60W 2050/146* (2013.01); *B60W 2540/225* (2020.02); *B60W 2540/229* (2020.02)

(58) Field of Classification Search
CPC ..... B60W 2050/143; B60W 2050/146; B60W 2540/225; B60W 2540/229; G06V 20/597
See application file for complete search history.

(56) References Cited

U.S. PATENT DOCUMENTS

| | | | |
|---|---|---|---|
| 10,154,130 B2* | 12/2018 | Abramson | H04W 4/027 |
| 10,317,900 B2* | 6/2019 | Kamhi | G06V 40/19 |
| 10,956,759 B1 | 3/2021 | Pertsel et al. | |
| 2010/0033333 A1* | 2/2010 | Victor | G06V 20/597 340/576 |
| 2014/0249717 A1 | 9/2014 | Takahashi | |
| 2015/0235538 A1* | 8/2015 | Konigsberg | A61B 5/163 340/439 |
| 2017/0108864 A1 | 4/2017 | Wiklinska et al. | |
| 2017/0161575 A1 | 6/2017 | Banno et al. | |
| 2017/0329329 A1 | 11/2017 | Kamhi et al. | |
| 2018/0126901 A1 | 5/2018 | Levkova et al. | |
| 2018/0164817 A1 | 6/2018 | Herz et al. | |
| 2018/0173225 A1 | 6/2018 | Kim et al. | |
| 2018/0225532 A1 | 8/2018 | Matsumura | |
| 2018/0284764 A1 | 10/2018 | Asghar et al. | |
| 2018/0319407 A1 | 11/2018 | Lisseman et al. | |
| 2018/0329415 A1 | 11/2018 | Aoi et al. | |
| 2019/0283778 A1* | 9/2019 | Dias | G02B 27/0179 |
| 2019/0318180 A1* | 10/2019 | Mudalige | G06V 30/226 |

OTHER PUBLICATIONS

Written Opinion corresponding to International Application No. PCT/EP2019/072523, dated Feb. 6, 2020, 5 pages.

Combined Search and Examination Report corresponding to Great Britain Application No. GB1815230.6, dated Feb. 19, 2019, 7 pages.

Chinese Office Action in corresponding Chinese application 201980069003.1, dated Apr. 8, 2023, 15 pages.

* cited by examiner

APPARATUS AND METHOD FOR MONITORING VEHICLE OPERATION

TECHNICAL FIELD

The present disclosure relates to a monitoring vehicle operation and particularly, but not exclusively, to determining whether vehicle operation is being monitored by an occupant of the vehicle. Aspects of the invention relate to a control system for a vehicle, to a method, to a system, to a vehicle and to computer software.

BACKGROUND

Vehicles are increasingly including autonomous modes of operation where one or more aspects of vehicle control are handled autonomously. For some levels of vehicle automation, a driver of the vehicle must still remain attentive to a driving task of the vehicle during operation in the autonomous mode. One example level of automation is Level 2 automation defined by SAE International, although other such definitions may be used, where the driver is required to remain attentive to the driving task during an autonomous mode of operation of the vehicle.

It is known to determine whether the driver is attentive to the driving task of the vehicle during the autonomous mode of operation by monitoring physical contact between the driver and a steering wheel of the vehicle. However, such monitoring of physical contact may not be appropriate in all circumstances. For example, when a vehicle is driven in an off-road environment a speed of the vehicle may be below that at which physical contact is required to be monitored. Furthermore, particularly (although not exclusively) during off-road driving, maintaining physical contact with the steering wheel may be inconvenient for the driver due to movement of the steering wheel in such off-road scenarios. For example, greater steering angles are likely to be encountered off-road i.e. the steering wheel experiences greater magnitudes of rotation, and a rate of change of the steering angle may also be lower off-road, one or both of which may make it inconvenient to monitor the driver's attention to the driving task using touch.

It is an object of embodiments of the invention to at least mitigate one or more of the problems of the prior art.

SUMMARY OF THE INVENTION

Aspects and embodiments of the invention provide a control system for a vehicle, to a method, to a system, to a vehicle and to computer software as claimed in the appended claims.

According to an aspect of the invention, there is provided a control system for a vehicle, the vehicle being operable in an at least partly autonomous mode and a manual mode, the control system comprising one or more controllers, the control system being configured to receive a gaze signal indicative of a direction of a gaze of an occupant of the vehicle, and a contact signal indicative of physical contact between the occupant and a control of the vehicle; and determine an estimate of the occupant's attention to a driving task in the at least partly autonomous mode in dependence on the gaze signal and on the contact signal. The estimate may be determined selectively in dependence on the gaze signal and the contact signal. The gaze signal and the contact signal may be determined in dependence on whether the occupant is obscured. Advantageously it is possible to determine the estimate of the driver's attention even whilst the occupant is obscured.

According to an aspect of the invention, there is provided a control system for a vehicle, the vehicle being operable in an at least partly autonomous mode and a manual mode, the control system comprising one or more controllers, the control system being configured to: receive a gaze signal indicative of a direction of a gaze of an occupant of the vehicle, said gaze signal being determined in dependence on image data relating to at least a portion of the occupant, the image data being output by at least one imaging means, and a contact signal indicative of physical contact between the occupant and a control of the vehicle; determine an estimate of the occupant's attention to a driving task in the at least partly autonomous mode in dependence on the gaze signal and to determine when the occupant is at least partly obscured relative to the at least one imaging means, wherein the control system is configured to determine the estimate of the occupant's attention to the driving task in dependence on the contact signal when it is determined that the occupant is at least partly obscured relative to the at least one imaging means; output a signal for initiating one or more actions, wherein the control system is configured to output the signal in dependence on the estimate of the driver's attention to the driving task and one or more predetermined threshold values. Advantageously the estimate of the driver's attention is determined even whilst the occupant is obscured.

The control system is optionally configured to determine the estimate of the occupant's attention to the driving task in dependence on the gaze signal being indicative of the occupant's gaze being directed to a driving region or a non-driving region. Advantageously it is determined whether the occupant is viewing a region related to driving the vehicle or a non-driving region and the estimate updated accordingly. It may be determined whether the occupant's gaze is directed to either the driving region or the non-driving region.

The control system being configured to determine the estimate of the occupant's attention to the driving task in dependence on the gaze signal may comprise the control system being arranged to determine a gaze-duration measure indicative of a duration of time for which the occupant's gaze is directed to the driving region and the non-driving region respectively. Advantageously the duration of time for which the occupant's gaze is directed to the driving region and non-driving region may be considered in determining the estimate.

The control system is optionally configured to suspend updating of the gaze-duration measure when the occupant is at least partly obscured relative to the at least one imaging means. Advantageously the gaze duration measure is suspended, rather than being updated or reset, when the occupant is obscured.

Optionally the control system is configured to output the signal when the gaze-duration measure reaches a predetermined threshold. Advantageously action is taken when the gaze-duration measure reaches the threshold.

The control system may be configured to update the gaze-duration measure in a first direction in dependence on the gaze signal being indicative of the driver's gaze being directed to a primary driving region, PDR, update the gaze-duration measure in a second direction at a first rate in dependence on the gaze signal being indicative of the driver's gaze being directed to a secondary driving region, SDR, and to update the gaze-duration measure in the second direction at a second rate in dependence on the gaze signal being indicative of the driver's gaze being directed to a non-driving region, NDR. Advantageously the gaze-duration measure takes into account when the occupant's gaze is directed to a region which is partly related to driving the vehicle, namely the SDR.

The second rate may be greater than the first rate. Advantageously the second rate accounts for the partial attention of the occupant to the driving task.

The control system being configured to determine the estimate of the occupant's attention to the driving task in dependence on the gaze signal may comprise the control system being configured to determine a gaze-distance measure indicative of a distance of travel ahead of the vehicle to which the occupant is deemed attentive. Advantageously the gaze-distance measure may account for a slow-moving vehicle which travels a relatively short distance in a period of time.

The control system may be configured to update the gaze-distance measure indicative of the occupant's gaze being directed to a driving region and the non-driving region, respectively. Advantageously a direction of the occupant's gaze to the driving region and non-driving region may be considered in determining the estimate. The updating may be performed in dependence on a velocity of the vehicle. Advantageously the velocity of the vehicle is taken into account in relation to the distance of travel of the vehicle.

The control system may be configured to update the gaze-distance measure in dependence on the velocity of the vehicle and a predetermined gain value. Advantageously the gain value may be used to control the updating in relation to the velocity of the vehicle.

The control system is optionally configured to update the gaze-distance measure in a first direction in dependence on the gaze signal being indicative of the driver's gaze being directed to a primary driving region, PDR, for a predetermined period of time, to update the gaze-distance measure in a second direction in dependence on the gaze signal being indicative of the driver's gaze being directed to one of a secondary driving region, SDR, or a non-driving region, NDR for a predetermined period of time. Advantageously the gaze-distance measure takes into account when the occupant's gaze is directed to a region which is partly related to driving the vehicle, namely the SDR.

The control system may be configured to output the signal in dependence both the gaze-duration measure and the gaze distance measure reaching respective predetermined thresholds. Advantageously by considering both measures reaching respective thresholds, false or accidental outputting of the signal may be avoided.

The determining the estimate of the occupant's attention to the driving task in dependence on the contact signal optionally comprises the control system being configured to determine a contact value at least partly representing the estimate of the driver's attention to the driving task and to update the contact value in dependence on the contact signal. Advantageously the contact value may be used to monitor the occupant's contact with the control of the vehicle.

Optionally the control system is configured to output the signal in dependence on both the gaze-duration measure and the contact value. Advantageously the duration of the occupant's gaze and the contact with the control of the vehicle are used to determine when to output the signal.

The control system is optionally arranged to update the estimate of the driver's attention to the driving task at periodic intervals. Advantageously the estimate is determined periodically.

The control system may be configured to output a suspend signal to initiate an at least partial suspension of operation of the vehicle in the autonomous mode in dependence on the estimate of the occupant's attention to the driving task and the one or more predetermined threshold values. Advantageously suspension of the autonomous operation may be initiated in dependence on the estimate.

Optionally the control system is configured to output a resume signal to resume operation of the vehicle in the autonomous mode dependence on the contact signal being indicative of physical contact between the driver and the control of the vehicle. Advantageously operation of the vehicle autonomously may be resumed in dependence on the estimate.

The at least partial suspension of operation of the vehicle in the autonomous mode may comprise the control system being arranged to reduce assistance in controlling lateral movement of the vehicle. Advantageously the suspension may reduce autonomous steering input to the vehicle.

The at least partial suspension of operation of the vehicle in the autonomous mode comprises the control system being arranged to maintain assistance in controlling longitudinal movement of the vehicle. Advantageously longitudinal control of the vehicle may be maintained which in some circumstances in particular, such as ascending or descending, is beneficial.

The control system is optionally configured to update the contact value in a first direction in dependence on the contact signal being indicative of physical contact between the driver and the control of the vehicle and to update the contact value in a second direction in dependence on the contact signal being indicative of an absence of physical contact between the driver and the control of the vehicle. Advantageously the contact value is updated in a direction dependent on the existence of contact.

According to an aspect of the present invention, there is provided a method for a vehicle operable in an at least partly autonomous mode and a manual mode, the method comprising receiving a gaze signal indicative of a direction of a gaze of an occupant of a vehicle, said gaze signal being determined in dependence on image data relating to at least a portion of the occupant, the image data being output by at least one imaging means, receiving a contact signal indicative of physical contact between the occupant and a control of the vehicle, determining an estimate of the occupant's attention to a driving task in the at least partly autonomous mode in dependence on the gaze signal, determining when the occupant is at least partly obscured relative to the at least one imaging means and, when so determined, determining the estimate of the occupant's attention to the driving task in dependence on the contact signal, initiating one or more actions in dependence on the estimate of the occupant's attention to the driving task and one or more predetermined threshold values.

Determining the estimate of the occupant's attention to the driving task in dependence on the gaze signal may comprise determining a gaze-duration measure indicative of a duration of time for which the occupant's gaze is directed to a driving region and a non-driving region respectively.

Optionally the method comprises updating the gaze-duration measure in a first direction in dependence on the gaze signal being indicative of the driver's gaze being directed to a primary driving region, PDR, updating the gaze-duration measure in a second direction at a first rate in dependence on the gaze signal being indicative of the driver's gaze being directed to a secondary driving region, SDR, and to update the gaze-duration measure in the second direction at a second rate in dependence on the gaze signal being indicative of the driver's gaze being directed to a non-driving region, NDR.

According to an aspect of the invention there is provided a control system for a vehicle, the vehicle being operable in an at least partly autonomous mode and a manual mode, the control system comprising one or more controllers, the control system being configured to: receive a gaze signal indicative of a direction of a gaze of an occupant of a vehicle, wherein said gaze signal is indicative of an occupant's gaze being directed to a primary driving region, PDR, a secondary driving region, SDR, or a non-driving region, NDR; determine an attention value indicative of an estimate of the occupant's attention to a driving task, wherein said attention value changed in a first direction in dependence on the gaze signal being indicative of the occupant's gaze being directed to the PDR, said attention value is changed in a second direction at a first rate in dependence on the gaze signal being indicative of the occupant's gaze being directed to the SDR and said attention value is changed in the second direction at a second rate in dependence on the gaze signal being indicative of the occupant's gaze being directed to the NDR; and output a signal to cause one or more actions to be performed in dependence on the attention value is equal to or exceeding a predetermined threshold value. Advantageously the attention value takes into account when the occupant's gaze is directed to a region which is partly related to driving the vehicle, namely the SDR.

The control system is optionally arranged to determine said attention value for each of a plurality of periods of time in dependence on the direction of the driver's gaze for the respective period of time. The second rate may be greater than the first rate.

In embodiments of a control system according to any preceding aspect, the one or more controllers may collectively comprise: at least one electronic processor having an electrical input for receiving the gaze signal and/or the contact signal; and at least one electronic memory device operatively coupled to the at least one electronic processor and having instructions stored therein; and wherein the at least one electronic processor is configured to access the at least one memory device and execute the instructions thereon so as to cause the at least one electronic processor to:

determine the estimate of the occupant's attention to a driving task in the at least partly autonomous mode in dependence on the gaze signal, and output the signal for initiating the one or more actions; or determine an attention value indicative of an estimate of the occupant's attention to a driving task and output the signal to cause the one or more actions to be performed in dependence on the attention value being equal to or exceeding a predetermined threshold value.

According to another aspect of the invention there is provided a system, comprising a control system as described above, and at least one imaging means for providing image data relating to at least a portion of an occupant of a vehicle.

The system may comprise contact means for outputting a contact signal indicative of physical contact between the occupant and a control of the vehicle.

According to another aspect of the invention there is provided a vehicle comprising a control system as described above or the system as described above.

According to a further aspect of the invention there is provided computer software which, when executed, is arranged to perform a method as described above. The computer software may be stored on a computer-readable medium. The computer software may be tangibly stored on the computer readable medium. The computer readable medium may be non-transitory.

According to a further aspect of the invention there is provided a non-transitory, computer-readable storage medium storing instructions thereon that, when executed by one or more electronic processors, causes the one or more electronic processors to carry out the method as described above.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
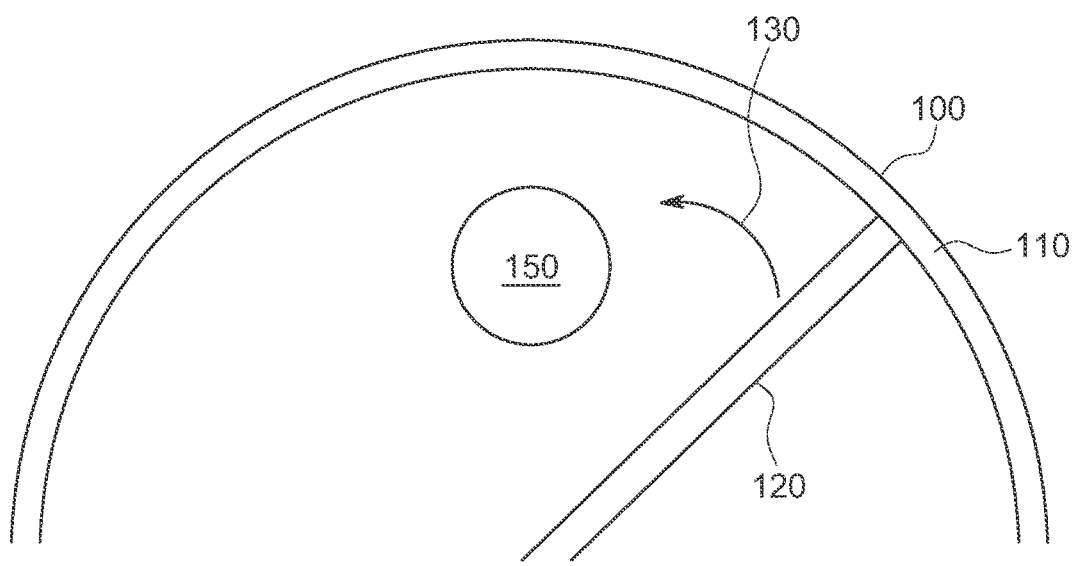
FIG. 1 shows an illustration of a steering control and an imaging means according to an embodiment of the invention.

FIG. 1 illustrates a steering control 100 and an imaging means 150 of a vehicle according to an embodiment of the invention. The steering control 100 is a steering wheel 100 which comprises an annular rim 110 and one or more spokes 120 radiating outward to the rim 110 from a central hub (not shown) of the steering wheel 100 about which the wheel 100 is rotated to control steering of the vehicle. The imaging means 150 is arranged to, in use, output image data relating to at least a portion of an occupant of the vehicle. The term occupant will be used to refer to a person within the vehicle who may, in a manual mode of operation of the vehicle, control the vehicle i.e. drive the vehicle. The vehicle is also operable in an at least partly autonomous mode of operation wherein one or both of longitudinal and lateral control of the vehicle is automated. In such autonomous mode, the occupant is not required to manually control the vehicle. Thus, the occupant of the vehicle may be a driver of the vehicle in the manual mode of operation. The occupant is required to remain attentive to a driving task of the vehicle in the autonomous mode.

The imaging means 150 may be a camera 150 or other imaging device 150 for example comprising a CCD (charge coupled device) sensor or the like. The camera 150 may be located forward (relative to the vehicle) of a plane of the steering wheel 100 i.e. such that the steering wheel 100 interposes the camera 150 and the occupant. The camera 150 is arranged to provide the image data relating to the portion of the occupant of the vehicle where the portion may comprise one or both of an upper torso and head of the occupant i.e. head and shoulders of the occupant, or only the head of the occupant. It may be desired for the image data to relate to a face of the occupant to determine a condition of the occupant. The condition may comprise a gaze direction of the occupant, wherein the gaze direction is a direction in which the occupant is looking as will be explained with reference to FIG. 3 in particular. The gaze direction may be determined relative to the vehicle. In order to provide such image data, the camera 150 may be located within the vehicle at a lower height than the occupant's head where such placement of the camera 150 may facilitate detecting whether the occupant's eyes are open or closed. The occupant may view downward to observe a region ahead of the vehicle or one or more instruments of the vehicle, for example. As such the steering wheel 100 may at least partly obscure the occupant relative to camera 150 during some periods of time. For example, when the steering wheel 100 is rotated, as indicated by arrow 130 in FIG. 1, the spoke 120 may move round to at least partly block the view of the occupant from the camera 150, thereby at least partially obscuring the occupant. This situation may occur frequently when the vehicle is in the off-road environment, or at least more frequently than during operation of the vehicle in an on-road environment, due to expected greater angles of steering being required to navigate obstacles and the like.

Figure 2:
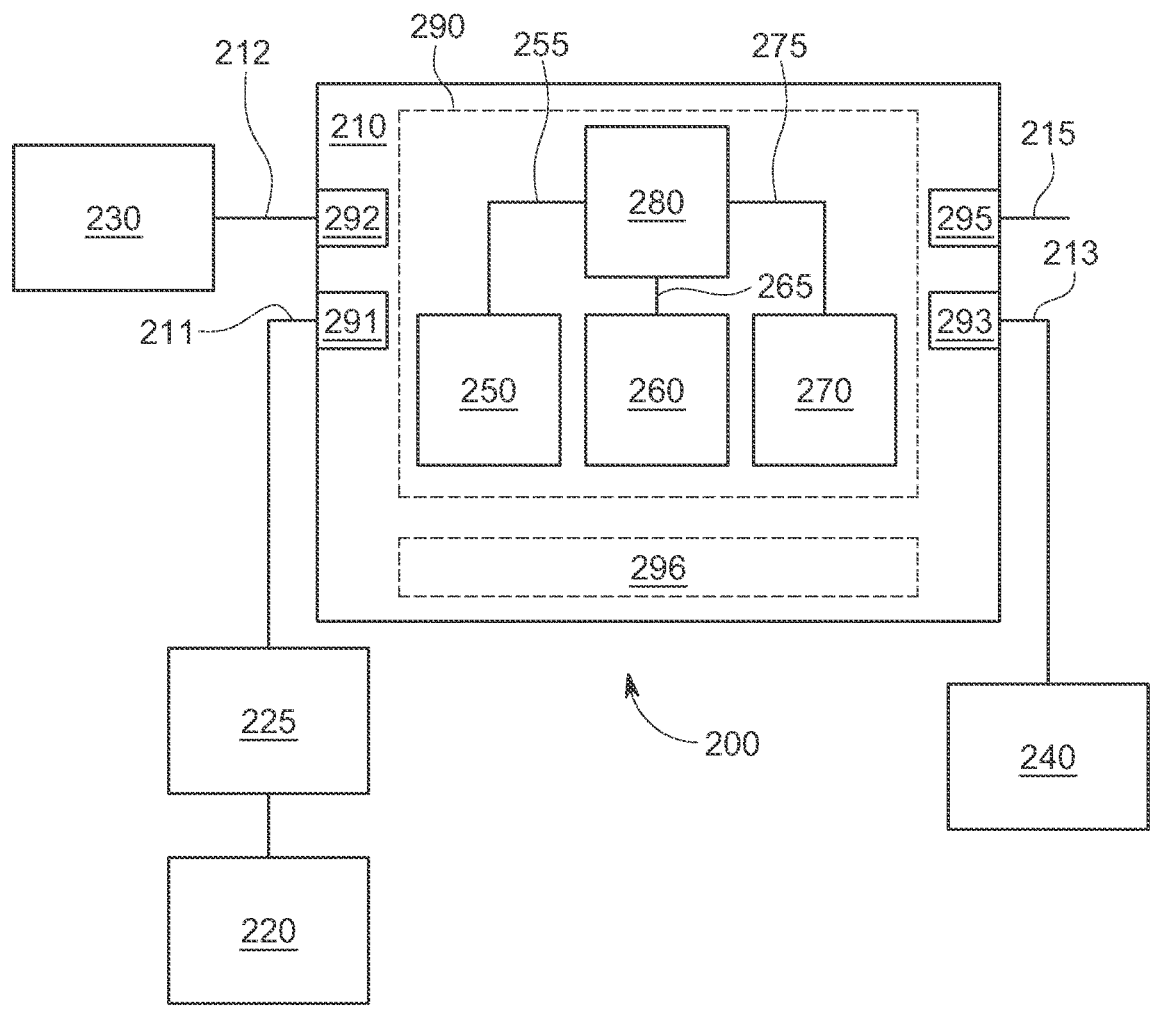
FIG. 2 shows a system including a controller according to an embodiment of the invention.

FIG. 2 illustrates a system, generally denoted as 200, according to an embodiment of the invention. The system 200 comprises a control system 210 or controller 210 for a vehicle according to an embodiment of the invention. As shown in FIG. 2, the control system 210 is implemented by one controller 210. It will be appreciated that the control system 210 may be implemented by a plurality of controllers acting as the control system 210.

The system 200 further comprises an imaging device 220, such as the camera 150 described above with reference to FIG. 1, a contact determining means 230 for determining physical contact between the occupant and a control of the vehicle, and a notification means 240 for providing a notification to the occupant, such as one or more of a visual, audible or haptic notification as will be explained.

The controller 210 comprises an input means 291 for receiving a gaze signal 211 indicative of a direction of a gaze of an occupant of the vehicle. The controller 210 comprises input means 292 for receiving a contact signal 212 indicative of physical contact between the occupant and a control of the vehicle such as the steering wheel 100. The input means 291, 292 may be electrical inputs to the controller 210 for receiving one or more electrical signal representing the gaze signal 211 and the contact signal 212.

The controller 210 comprises an output means 293 for outputting a notification signal 213 to the notification means 240. The notification signal 213 is indicative of one or more of visual, audible or haptic notification to be output by the notification means 240. The notification means 240 may comprise one or more of one or more visual output devices, such as for outputting a visual signal or indication to the occupant, one or more audible output devices for outputting an audible signal or indication to the occupant, and one or more haptic output devices for outputting a haptic notification or indication to the occupant. The controller 210 controls the output means 293 to output the notification signal 213 to cause output of an appropriate notification to the occupant, as will be explained particularly with reference to FIG. 7.

The controller 210 may comprise an output means 295 for providing a control signal 215 to control operation of the vehicle. The controller 210 is arranged to control the output means 291 to output the control signal 215 to select operation of the vehicle in the manual or autonomous modes of operation. For example, the output means 295 may output the control signal 215 to cause a transition from the autonomous mode to the manual mode of operation of the vehicle. In some embodiments, the output means 295 is controlled by the controller to output the control signal 215 to initiate an at least partial suspension of operation of the vehicle in the autonomous mode. The controller 210 may control the output means 295 to output the control signal 215 to cause a resumption of operation of the vehicle in the autonomous mode, as will be explained. The control signal 215 may be provided to an autonomous controller of the vehicle (not shown in FIG. 2).

The electrical inputs and outputs of the controller 210 may be provided to/from a communication bus or network of the vehicle, such as a CANBus or other communication network which may, for example, be implemented by an Internet Protocol (IP) based network such as Ethernet, or FlexRay.

The gaze direction of the occupant is determined in dependence on image data relating to at least a portion of the occupant, such comprising the head and/or face of the occupant. The gaze direction may be determined by a gaze direction module 225 which is arranged to receive image data from the imaging device 220, and the gaze signal 211 provided to the controller 210 by the gaze direction module 225. In other embodiments, the image data may be provided to the controller 210 and the gaze direction determined by the controller 210 i.e. the controller may incorporate the gaze detection module 225. The gaze signal 211 may also indicate when it is not possible to determine the gaze direction of the occupant, such as due to the occupant being at least partly obscured relative to the imaging device 220 where the obscuration may be due to a part of the steering wheel 100 blocking the view of the occupant from the imaging device 220 such as the camera 150.

Figure 3:
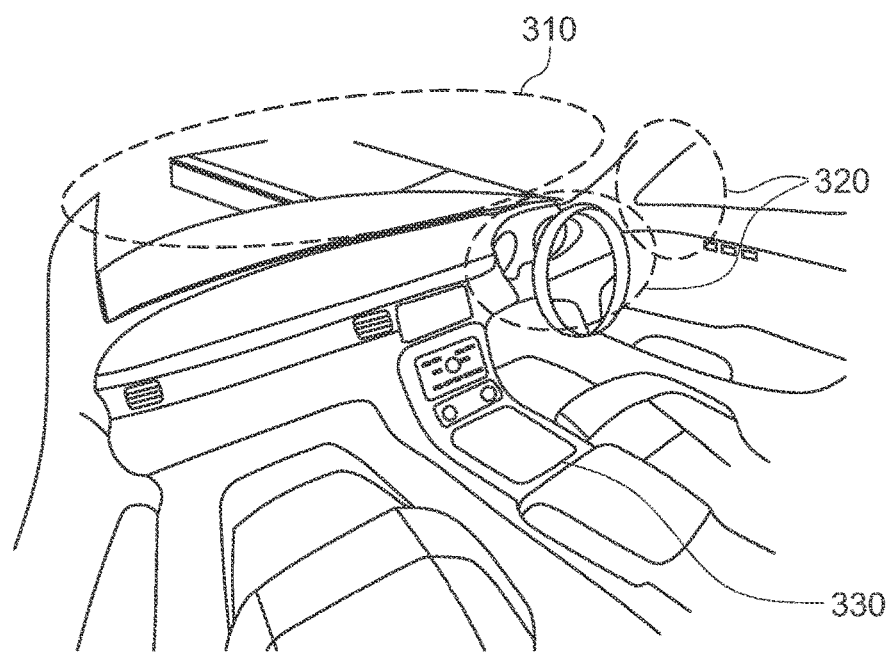
FIG. 3 shows an interior view of a vehicle and driving regions according to an embodiment of the invention.

Referring to FIG. 3, in some embodiments, the gaze direction module 225 is arranged to determine whether the occupant's gaze is directed to a primary driving region (PDR) 310 or a non-driving region (NDR) 330. In other embodiments, the gaze direction module 225 is arranged to determine whether the occupant's gaze is directed to one of the PDR 310, the NDR 330 or one or more secondary driving regions (SDRs) 320. The gaze signal 211 may thus be indicative of the occupant's gaze being directed to the PDR, NDR or SDR.

As illustrated in FIG. 3, the PDR 310 is a direction of gaze of the occupant toward an area over which the vehicle will traverse, generally a region ahead of the vehicle, which may be arcuate in shape, to thereby allow for the vehicle to have steering applied whilst moving forwards. The PDR 310 may correspond to a view through a front window of the vehicle i.e. the windscreen of the vehicle.

The SDR 320 corresponds to one or more regions of secondary importance for controlling the vehicle. The one or more regions may comprise one or more of one or both side windows of the vehicle i.e. front door windows, mirrors or display devices providing an external view of the vehicle, such as rear or side views from the vehicle, an instrument cluster or display device providing control information for the vehicle such as indicative of speed, a presence of other vehicles i.e. alongside the primary vehicle of the occupant etc. FIG. 3 illustrates two SDRs 320 corresponding to a position of a wing mirror of the vehicle and an instrument cluster, which it will be appreciated are examples and not limiting.

The NDR 330 may correspond to any direction of gaze of the occupant not corresponding to the PDR 310 and the one or more SDRs 320. For example, the NDR 330 is a direction of gaze towards an infotainment or navigation system of the vehicle, an interior region of the vehicle not being the SDR 320.

Referring back to FIG. 2, the contact signal 212 is indicative of physical contact between the occupant and the control of the vehicle, such as the steering wheel 100. The contact signal 212 indicates whether the occupant is physically touching, or in contact with, the steering wheel 100.

The controller 210 comprises one or both of a gaze duration module (GDURM) 250 and a gaze distance module (GDISM) 260. The GDURM 250 and GDISM 260 may operate in parallel i.e. simultaneously, as will be explained. The controller 210 comprises a contact module (CM) 270 and an attention module (AM) 280. The GDURM 250, GDISM 260, CM 270 and AM 280 may be implemented in hardware or as software modules which operatively execute on an electronic processor 290 as indicated with dotted lines in FIG. 2. Computer-readable instructions for implementing the GDURM 250, GDISM 260, CM 270 and AM 280 on the processor 290 may be stored in a memory 296 accessible to the processor 290.

The AM 280 is configured to determine an estimate of the occupant's attention to a driving task when the vehicle is operative in the autonomous mode. The estimate of the occupant's attention to the driving task is a measure of how much attention the occupant is providing to the driving task whilst the vehicle is operative in the autonomous mode. As will be explained, the estimate is determined in dependence on an output 255, 265, 275 of one or more of the GDURM 250, GDIS 260 and CM 270. The AM 280 is arranged to receive the gaze signal 211 and to determine when the occupant is at least partly obscured relative to the camera 220, 150. The determination may be made in dependence on the gaze signal 211 indicating that the occupant is at least partly obscured, such that their direction of gaze cannot be determined, or by the AM 280 determining that the occupant is at least partly obscured in dependence on the image data provided by the imaging device 220 such as the camera 150. For example, the gaze detection module 225 may determine that a shape corresponding, for example, to the occupant's head or face cannot be recognised from the image data and therefore that the occupant is obscured and the gaze signal 211 provide an indication thereof to the AM 280. In some embodiments, one of the gaze detection module 225 and AM 280 may infer that the occupant is obscured. Such inference may be made in dependence on data indicative of a steering angle of the vehicle, such that an arm 120 of the steering wheel 100 is likely to obscure the view of the occupant.

When the occupant is not obscured i.e. that the gaze direction of the occupant can be determined, the AM 280 is arranged to determine the estimate of the occupant's attention to the driving task in dependence on one or both of an output of the GDURM 250 and the GDISM 260. However, when the AM 280 determines that the occupant is obscured, the estimate of the occupant's attention to the driving task is determined in dependence on the contact signal 212. In particular, whilst obscured the AM 280 determines the estimate in dependence on an output 275 of the CM 270.

The GDURM 250 is arranged to determine a gaze-duration measure indicative of a duration of time for which the occupant's gaze is directed to a driving region and a non-driving region, respectively. The driving region may correspond to the PDR 310 and the non-driving region the NDR 330 examples of which are shown in FIG. 3. In some embodiments, the GDURM 250 is arranged to determine the gaze-duration measure indicative of the respective durations of time for which the occupant's gaze is directed to the PDR 310, SDR 320 and NDR 330, respectively. The GDURM 250 may employ a sliding window such that the gaze-duration measure is indicative of a proportion of time for which the occupant's gaze is directed to the PDR 310, SDR 320 and NDR 330, respectively, within a period of time corresponding to the sliding window. The GDURM 250 is arranged to provide the AM 280 with a signal 255 indicative of the gaze-duration measure.

The GDISM 260 is arranged to determine a gaze-distance measure indicative of a distance of travel ahead of the vehicle to which the occupant is deemed to be attentive. The gaze-distance measure may be determined in dependence on a velocity of the vehicle, as will be explained. The GDISM 260 is arranged to provide the AM 280 with a signal 265 indicative of the gaze-distance measure.

Figure 4:
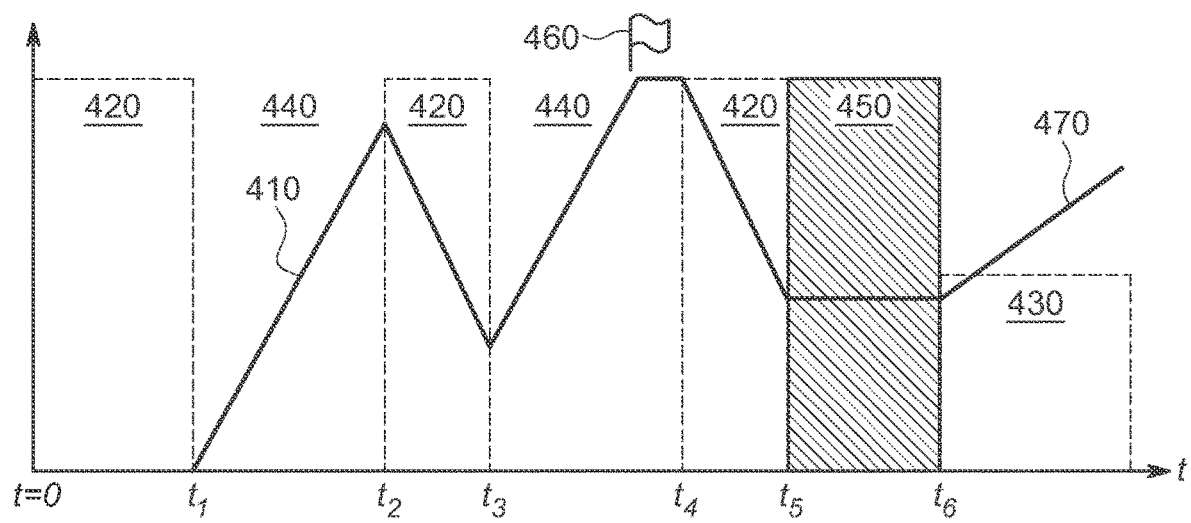
FIG. 4 illustrates a gaze-duration monitor value according to an embodiment of the invention.

Operation of the GDURM 250 according to an embodiment of the invention will be explained with reference to FIG. 4. FIG. 4 illustrates a value of the gaze-duration measure 410 over time t according to an embodiment of the invention. Also illustrated in FIG. 4 are periods 420 of time for which the occupant's gaze is directed to the PDR 310, a period of time 430 for which the gaze is directed to one of the one or more SDRs 320, and periods 440 to the NDR 330. FIG. 4 also illustrates a period 450 of time for which the view of the occupant is obstructed from the camera 150, 220.

FIG. 4 is assumed to start, as an example, with the occupant's gaze directed to the PDR 420 and the gaze measure having an initial value corresponding to maximum attention of the occupant i.e. the occupant is deemed fully attentive to the driving task of the vehicle, even though the vehicle is being driven in the autonomous mode. It will be appreciated that these initial conditions are merely an example. In FIG. 4 the initial value corresponds to a minimum value of the gaze-duration measure. It will be assumed that the minimum value is zero, although it will be appreciated that other values may be used. In other embodiments the value of the gaze duration measure corresponding to maximum attention of the occupant may be a maximum value of the gaze duration measure. In such embodiments it will be appreciated that in the description that follows reference to increasing is replaced with decreasing and reference to decreasing replaced with increasing.

During period 420 starting from t=0 the gaze duration measure is not increased as the occupant is deemed to be fully attentive and currently observing the vehicle's situation. After a period of time the occupant disengages from fully observing the vehicle's situation by having their gaze directed to the PDR 310, and directs their gaze towards the NDR 330, as in period 440 starting at $t_1$. The GDRUM 250 is arranged to update the gaze-duration measure 410 in an opposing direction to during period 420 which is an increasing, in this example, direction i.e. to increase the value of the gaze-duration measure 410 for the duration of time for which the occupant's gaze is directed towards the NDR 330. At $t_2$, the GDRUM 250 determines that the occupant's gaze is directed back to the PDR 310, the GDRUM 250 is arranged to update the gaze-duration measure 410 in a decreasing, in this example, direction i.e. to decrease the value of the gaze-duration measure 410 for the duration of time for which the occupant's gaze is directed towards the PDR 310. It will be appreciated that the gaze-duration measure is only decreased until the minimum value, such as 0, is reached which is then maintained. The gaze-duration measure 410 may be increased and decreased by the GDRUM 250 at a unit value for each predetermined period of time such as 100 ms, 500 ms, for example. The rate of increase and decrease may differ in the respective directions in some embodiments. In the period of time beginning at $t_3$ the occupant's gaze is again directed to the NDR 330 and the GDURM 250 again increases the gaze-duration measure 410. When the gaze-duration measure reaches a threshold value, which may be a maximum value which the gaze-duration measure 410 is able to adopt, the GDURM 250 outputs a gaze-duration signal 255 to the AM 280 indicative of the gaze-duration measure reaching the threshold as indicated by flag symbol 460 in FIG. 4.

The gaze-duration measure 410 is decreased during period 420 beginning at $t_4$ for which the occupant's gaze is directed to the PDR 310. When the gaze-duration measure drops below the threshold the gaze-duration signal 255 may cease to be output.

During period 450 beginning at $t_5$ the direction of the occupant's gaze cannot be determined because the occupant is at least partly obscured from the camera 150, 220. During this period 450, the GDURM 250 is configured to suspend updating of the gaze-duration measure 410 whilst the occupant is at least partly obscured relative to the camera 150, 220. That is, by suspend it is meant that the value of the gaze-duration measure is maintained at its value immediately preceding the occupant being obscured, as indicated by horizontal value of the line representing the gaze-duration measure 410 during period 450. Once the occupant is no longer obscured i.e. the direction of the occupant's gaze can be determined again, the GDURM 250 is configured to resume updating of the gaze-duration measure 410. As will be explained below, during the period 450 of obscuration the AM 280 may determine the estimate of the occupant's attention to the driving task using the CM 270.

In the example shown in FIG. 4, in the period 430 beginning at $t_6$ it is determined that the occupant's gaze is directed, in one embodiment, to the one of the one or more SDRs 320. Whilst directed to the SDR 320, the occupant is deemed in some embodiments to be partially, but not fully, attentive to the vehicle's operation. Therefore, in some embodiments, the gaze-duration measure 410 is increased, in the example, by the GDURM 250 but at a different rate to when the occupant's gaze is directed to the NDR 330. The different rate, corresponding to the SDR 320, may be lower i.e. the gaze-duration measure 410 is increased, but more slowly, than that for the NDR 330.

As will be appreciated from the above, the GDURM 250 in some embodiments is arranged to update the gaze-duration measure 410 in a first direction in dependence on the gaze signal being indicative of the driver's gaze being directed to the PDR 310. The GDURM 250 is further configured in some embodiments to update the gaze-duration measure in a second direction at a first rate in dependence on the gaze signal being indicative of the driver's gaze being directed to a secondary driving region, SDR 320, and to update the gaze-duration measure in the second direction at a second rate in dependence on the gaze signal being indicative of the driver's gaze being directed to a non-driving region, NDR 330. The second rate may be greater than the first rate. This may be referred to as a dual-rate leaky bucket wherein gaze being directed to the PDR 310 represents filling of the bucket and gaze direction to the SDR and NDR represent emptying of the bucket at one of two rates, respectively.

The gaze-duration measure 410 may allow for a period of inattention by the occupant to the driving task i.e. a predetermined period of time may be allowed from being fully attentive to the gaze-duration measure 410 causing output of the gaze-duration signal 255. The period of time may correspond to a period of time for the vehicle to travel a predetermined distance at a maximum velocity of the vehicle in the autonomous mode. The maximum velocity may correspond to 10, 20 or 30 $kmh^{-1}$ although it will be appreciated that other maximum velocity values may be used The GDISM 260 is arranged to determine the gaze-distance measure indicative of a distance of travel ahead of the vehicle to which the occupant is deemed to be attentive. The GDISM 260 is arranged to receive the gaze signal 211 indicative of the direction of a gaze of the occupant. The GDISM 260 is arranged to update the gaze-distance measure in dependence on the direction of gaze of the occupant to represent a distance of travel ahead of the vehicle to which the occupant is deemed to be attentive i.e. to have paid attention to. In some embodiments, the GDISM 260 updates the gaze-distance measure according to a duration of the occupant's gaze being directed to the PDR 310 to represent increasing distance ahead of the vehicle to which the occupant is attentive. In some embodiments, the gaze-distance measure is decreased in dependence on a velocity of the vehicle.

Referring to FIG. 5(a), there is illustrated a vehicle 510 at an initial location whilst driving in the autonomous mode in direction of arrow 515. The GDISM 260 is arranged to receive the gaze signal 211 which, in the described example, is indicative of the occupant's gaze being directed to the PDR 310. The GDISM 260 is arranged to determine a duration of time for which the occupant's gaze is directed to the PDR 310 and to compare the duration against a gaze-distance threshold period. The gaze-distance threshold period may be between 1 and 10 seconds in some embodiments. In some embodiments the gaze-distance threshold period may be less than 5 seconds. In one embodiment the gaze-distance threshold period may be around 2 seconds. If the occupant's gaze is directed to the PDR 310 for a period of time which is at least the gaze-distance threshold period, the GDISM 260 is arranged to update the gaze-distance measure to be indicative of a predetermined distance d ahead of the vehicle 510. In some embodiments, the GDISM 260 is arranged to update the gaze-distance measure proportionally in dependence on the duration of the occupant's gaze being directed to the PDR 310. That is, if the occupant's gaze is directed to the PDR 310 for a portion of the gaze-distance threshold period, the GDSIM 260 is arranged to update the gaze-distance measure to represent the same portion of the distance d. Therefore, the gaze being directed to the PDR 310 for half of the gaze-distance threshold period causes the GDSIM 260 to update the gaze-direction measure to represent 0.5 d.

Figure 5:
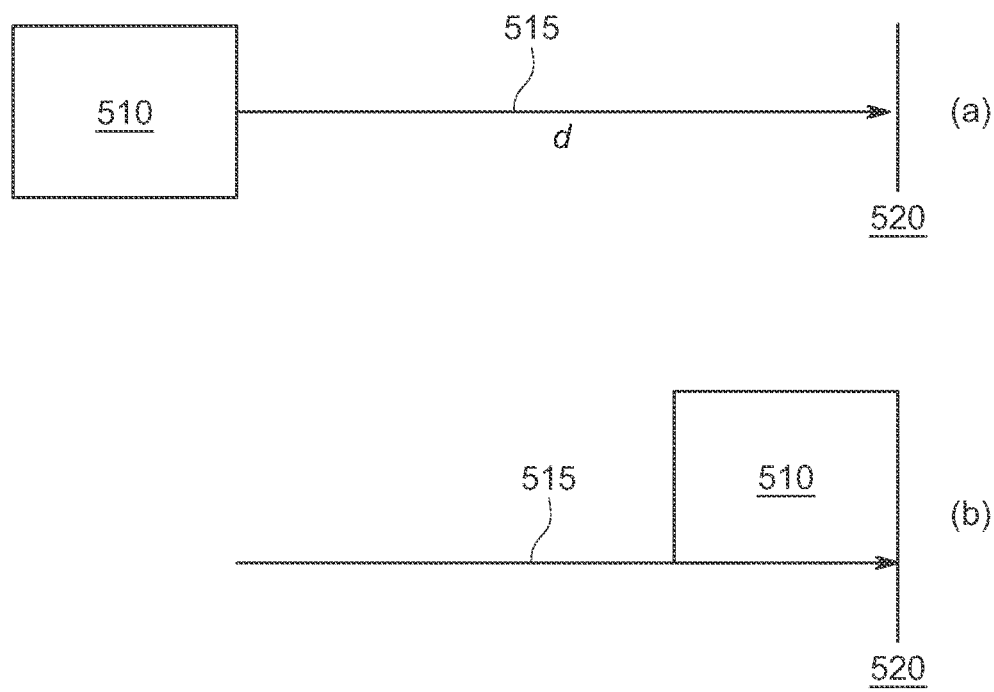
FIG. 5 illustrates a gaze-distance monitor according to an embodiment of the invention.

As shown in FIG. 5(*a*) line 520 represents the gaze-distance measure 520 indicative of an extent of the distance ahead of the vehicle 510 for which the GDISM 260 has determined the occupant to be attentive. If the occupant's gaze is subsequently directed to the NDR 330, the GDISM 260 may not update the gaze-distance measure in some embodiments. In other words, the gaze-distance measure may not updated, or increased, to represent additional distance ahead of the vehicle 510. As the vehicle 510 continues to move forward in the autonomous mode, without the occupant's gaze being directed to the PDR 310, the vehicle 510 eventually reaches the extent of the gaze-distance measure 520 i.e. the vehicle reaches a location corresponding to line 520 as shown in FIG. 5(*b*). The GDISM 260 is arranged to output a signal 265 to the AM 280 when the vehicle 510 reaches the location corresponding to the line 520.

In some embodiments, the GDISM 260 is configured to update the gaze-distance measure 520 indicative of decreasing distance ahead of the vehicle 510 in dependence on the gaze signal 211. The gaze-distance measure 520 may be updated to be indicative of decreasing distance ahead of the vehicle 510 when the gaze signal 211 indicates that the occupant's gaze is directed to one of the one or more SDRs 320 or the NDR 330. The updating may be performed in dependence on a velocity of the vehicle 510.

The GDISM 260 may be configured to update the gaze-distance measure in dependence on the velocity of the vehicle and a predetermined gain value. The GDISM 260 may be arranged to update the gaze-distance measure according to:

$$GDM = -gv$$

Where GDM is the gaze-distance measure, g is a predetermined gain value and v is a velocity of the vehicle 510.

As noted above, the GDURM 250 and GDISM 260 may operate in parallel to simultaneously determine the gaze-duration measure and the gaze-distance measure, respectively. An indication of each of the gaze-duration measure and the gaze-distance measure are simultaneously provided to the AM 280.

The CM 270 is arranged to receive the contact signal 212 indicative of physical contact between the occupant and a control of the vehicle. The contact signal 212 may be indicative of the occupant touching the steering wheel 100. The contact signal 212 is output by the contact determining means 230 which may be a contact detection device 230. The contact between the occupant and the control may be determined, for example, by the contact detection device 230 comprising a capacitance touch sensing device or by the occupant forming a portion of a conductive path between the control and a seat of the vehicle which is detected by the contact detection device 230, for example by the device 230 outputting and receiving a signal conducted via the occupant. It will be appreciated that physical contact may be determined in other ways, such as torque sensing i.e. sensing a torque either inputted to the steering wheel 100 by the occupant or a torque resistance of the occupant to torque inputted to the steering wheel such as by a motor, grip sensing i.e. sensing a compression caused by an application of grip to the steering wheel, or via pressure pads, for example. It will be appreciated that this list is not exhaustive. The contact detecting device 230 outputs the contact signal 212 indicative of the contact between the occupant and the control, such as the steering wheel 100.

In some embodiments, the CM 270 is arranged to receive the contact signal 212 and to maintain a contact measure indicative of the occupant's contact with the control of the vehicle, such as the steering wheel 100. In some embodiments, the CM 270 is configured to determine that the occupant is in contact with the steering wheel 100 for a major portion of time. That is, that the occupant predominantly touches the steering wheel 100, rather than occasionally makes contact with the steering wheel 100. This is contrast with some prior approaches to determining that an occupant is aware of a vehicle's situation where periodically touching of a control may be sufficient.

Figure 6:
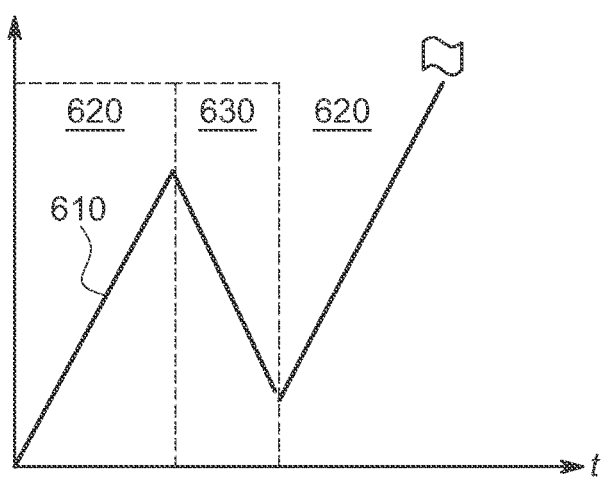
FIG. 6 illustrates a contact monitor value according to an embodiment of the invention.

The CM 270 in some embodiments maintains the contact measure according to a leaky bucket protocol. FIG. 6 illustrates the contact measure 610 maintained by the CM 270 in dependence on the contact signal 212 according to an embodiment of the invention. In the example of FIG. 6 the CM 270 is arranged to update the contact measure 610 in a first direction indicative of a lack of contact between the occupant and the steering wheel 100. The first direction may correspond to an increase of the contact measure 610. The CM 270 is arranged to update the contact measure in a second direction indicative of contact between the occupant and the steering wheel 100. The second direction may correspond to a decrease in value of the contact measure 610.

As shown in FIG. 6, during period 620 the CM 270 receives the contact signal 212 indicative of a lack of contact between the occupant and the steering wheel 100 and the CM 270 increases the contact measure 610 in dependence thereon at a first rate. During period 630 the CM 270 receives the contact signal 212 indicative of contact between the occupant and the steering wheel 100 and the CM 270 decreases the contact measure 610 in dependence thereon at a second rate. The first and second rates may be equal in some embodiments. When the contact measure 610 reaches a predetermined contract measure threshold, the CM 270 is arranged to output a signal 275 to the AM 280 indicative of a lack of physical contact between the occupant and the steering wheel 100.

The AM 280 is operative in first and second modes to determine the occupant's attention to the driving task in dependence on whether the occupant is obscured from the imaging device 220. In the first and second modes a different combination of the inputs 255, 265, 275 are utilised to determine the occupant's attention to the driving task. In the first mode, when the occupant is not obscured, the AM 280 is arranged to determine the estimate of the occupant's attention to the driving task in dependence on one or both of the signals 255, 265 provided by the GDURM 250 and GDISM 260, respectively. In some embodiments, the AM 280 is configured to control one or both of the output means 293, 295 to output the notification signal 213 and control signal 215 in dependence on both the gaze-duration signal 255 indicative of the gaze-duration measure and the gaze-distance signal 265 indicative of the gaze distance measure reaching respective predetermined thresholds. In the second mode, when the occupant is at least partly obscured, AM 280 is arranged to determine the estimate of the occupant's attention to the driving task in dependence the signal output by the CM 270.

When it is determined that the occupant is not attentive to the driving task of the vehicle in the autonomous mode, in some embodiments when both the signal 255 and 265 are provided to the AM 280 indicative of the occupant not being attentive, the AM 280 is arranged to initiate an attention warning method in dependence thereon.

Figure 7:
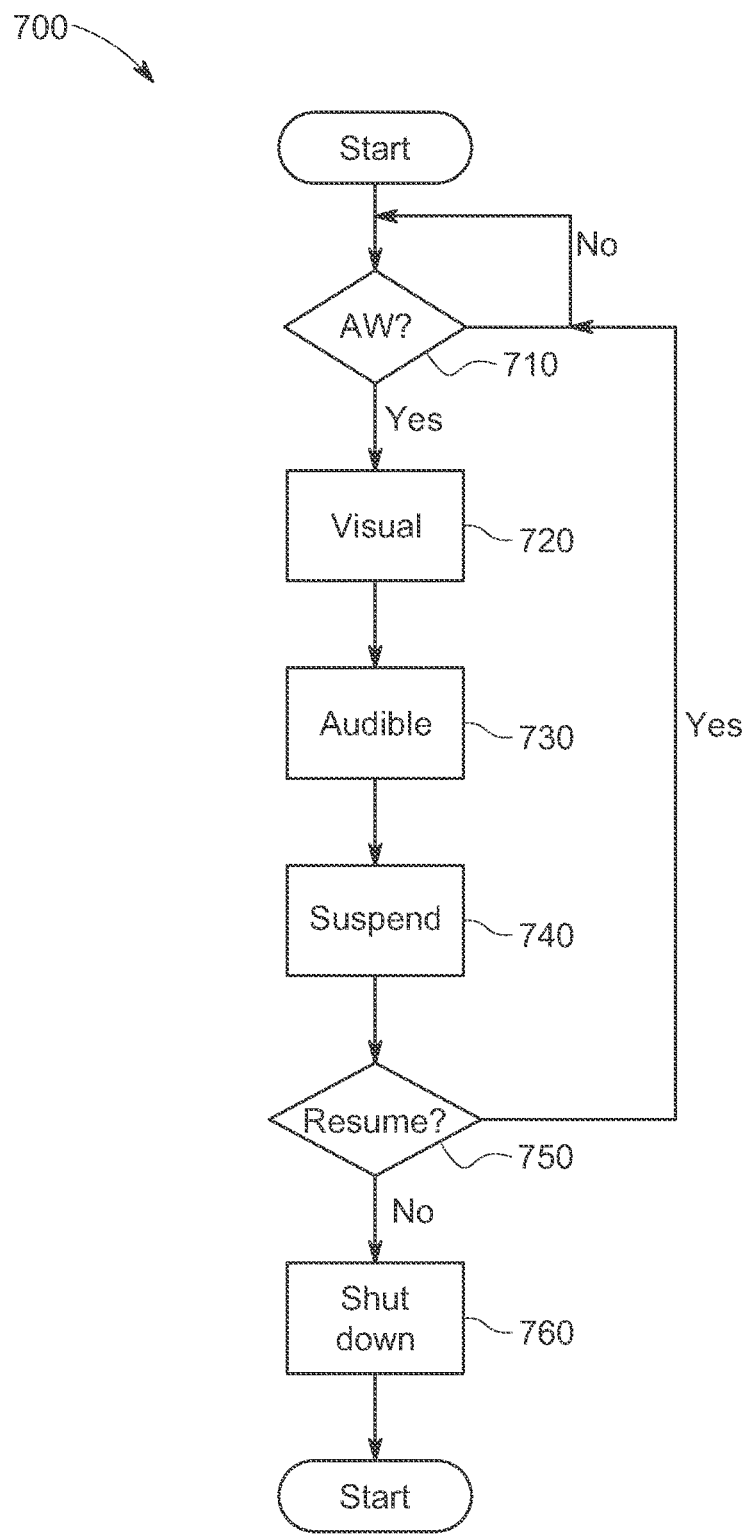
FIG. 7 illustrates a method according to an embodiment of the invention.

An attention warning method 700 according to an embodiment of the invention is illustrated in FIG. 7. The method 700 may be implemented by the controller 210, in particular by the AM 280 operably supported thereon. The method 700 may cause output of one or both of the notification signal 213 and the control signal 212 by the controller under control of the AM 280. The method 700 may be implemented continuously by the AM 280 whilst the vehicle is operational in the autonomous mode i.e. the method is started once the vehicle operates in the autonomous mode.

The method 700 comprises a step 710 of determining whether one or more predetermined attention warning conditions (AW) are met. The AW conditions may comprise an output 255, 265, 275 of one or more of the GDURM 250, GDIS 260 and CM 270. The AW conditions may comprise both of the signals 255, 265 from the GDURM 250, GDIS 260 indicating that the occupant is not paying sufficient attention to the driving task, as described above. Alternatively, where the camera 150, 220 is obscured, the AW conditions may comprise the output 275 from the CM 270 indicating that the occupant has not maintained sufficient contact with the steering wheel 100.

In step 710, if it is determined that the AW conditions exist, the method moves to steps 720, 730 where the occupant is provided with a notification of the insufficient attention to the driving task. Steps 720, 730 may vary between embodiments of the invention and comprise a staged notification strategy provided to the occupant. By staged it is meant that one or more of visual, audible and haptic notification is provided to the occupant in an escalating manner. In the illustrated embodiment step 720 comprises providing a visual notification to the occupant. The visual notification may comprise an indication being output by a visual display device. The visual output may be provided for at least a predetermined period of time, such as between 2 and 20 seconds. In some embodiments step 720 is maintained for 15 seconds before the method moves to step 730. In step 730 an audible notification is provided to the occupant. The audible notification may comprise an indication being output by an audio output device. Step 720 may continue to be performed in parallel with step 730 in some embodiments. Step 730 may be performed for between 2 and 20 seconds. In some embodiments step 730 is maintained for 15 seconds. In some embodiments steps 720 and 730 are performed in total for at least 20 seconds. In one embodiments steps 720 and 730 are performed for 30 seconds. If during one or both of steps 720, 730 it is determined that the one or more AW conditions cease, then the method may return to step 710 i.e. the one or more visual, audible and haptic notifications may cease in dependence on the one or more AW conditions ceasing. Steps 720, 730 are performed whilst the vehicle continues to operate in the autonomous mode.

If the one or more AW conditions do not cease, then the method moves to step 740 wherein the autonomous mode is at least partly suspended. By at least partly suspended it is meant that the assistance to driving the vehicle provided in the autonomous mode is reduced. In step 740 the assistance to driving the vehicle provided in the autonomous mode may be partially maintained. Furthermore, by suspended it is meant that the assistance provided in the autonomous mode may be resumed or increased in response to the one or more AW conditions ceasing. For example, the autonomous mode may be resumed in dependence on the occupant touching the steering wheel 100 or the occupant's gaze being directed to the PDR 310. During step 740 steps 720, 730 may be maintained i.e. the one or more visual, audible and haptic notifications may continue to be output during step 740.

Step 740 may comprise the AM 280 causing the output of a suspend signal 215 to initiate an at least partial suspension of operation of the vehicle in the autonomous mode. Similarly, determining during step 740 that the one or more AW conditions have ceased may cause the AM 280 to output a resume signal 215 to cause a resumption operation of the vehicle in the autonomous mode. The suspend signal 215 may be arranged to cause the reduction of assistance in controlling lateral movement of the vehicle in the autonomous mode. The reduction of assistance in controlling lateral movement of the vehicle may comprise a reduction of steering assistance in the autonomous mode. In one embodiment, the reduction of assistance may comprise the cessation of steering of the vehicle. In one embodiment the AM 280 is arranged to maintain assistance in controlling longitudinal movement of the vehicle i.e. to continue to control a speed of the vehicle even whilst the assistance in the autonomous mode is reduced. Advantageously, since the vehicle may be in a driving situation involving a significant longitudinal gradient i.e. uphill or downhill, it may be undesirable to reduce assistance in controlling longitudinal movement of the vehicle such as reducing braking assistance or torque provided to one or more wheels of the vehicle during step 740. Step 740 may be maintained for a predetermined period of time, such as up to 45 seconds. In one embodiment step 740 may be performed for 30 seconds. In one embodiment a total duration of steps 720-740 may be 60 seconds.

In step 750 it is determined whether the one or more AW conditions have ceased or been removed. If not, the method moves to step 760. If the one or more AW conditions have ceased, then the method returns to step 710. It will be appreciated that step 750 may be performed periodically, or at one or more other points, during steps 720-740. In particular, it will be appreciated that whilst step 750 is illustrated as following step 740 in FIG. 7, a resume step 750 may be performed between each of steps 720, 730, 740 to determine whether the one or more AW conditions have ceased. However, for clarity, only one step 750 is illustrated in FIG. 7.

If the method reaches step 750 the autonomous mode may be disabled. Disabling of the autonomous mode may comprise the vehicle being caused to stop. Step 750 may comprise applying braking torque to one or more wheels of the vehicle to bring the vehicle to a stop. In some embodiments, as the method progresses through steps 720, 730, 740 a reduction in speed of the vehicle at some or each step 720, 730, 740 may be performed, such that in step 760 suspension of the autonomous mode advantageously occurs at a lower speed of the vehicle.

Figure 8:
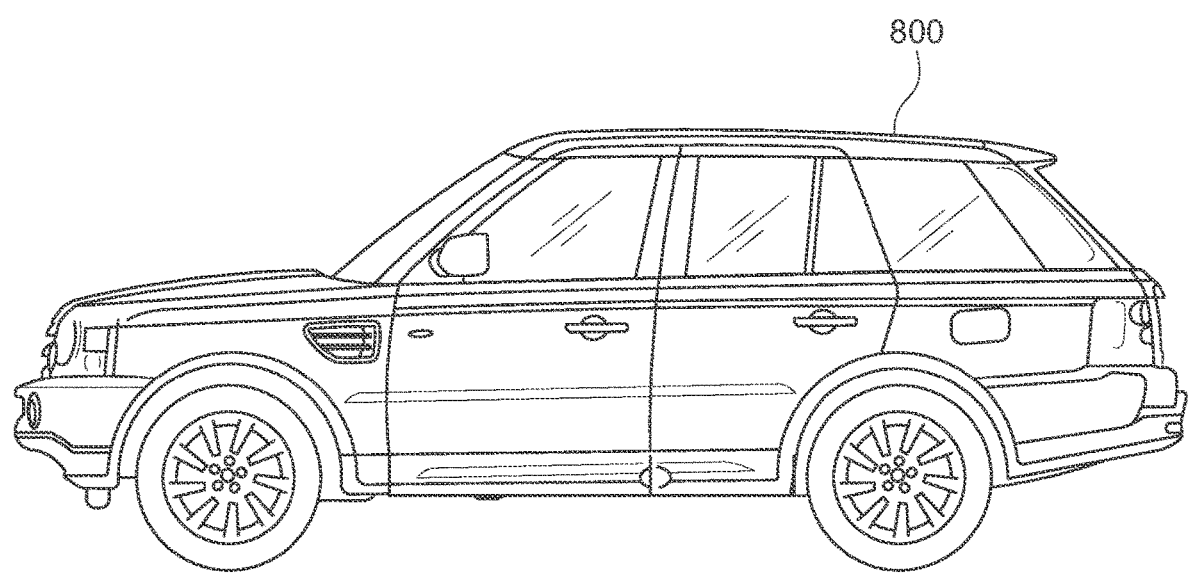
FIG. 8 illustrates a vehicle according to an embodiment of the invention.

FIG. 8 shows a vehicle 800 according to an embodiment of the invention. The vehicle 800 is a wheeled vehicle. The vehicle 800 may comprising a control system 210 as described above and or a system 200 as described. In some embodiments the vehicle 800 may be arranged to perform a method according to an embodiment of the invention, such as that illustrated in FIG. 7 or FIG. 9.

Figure 9:
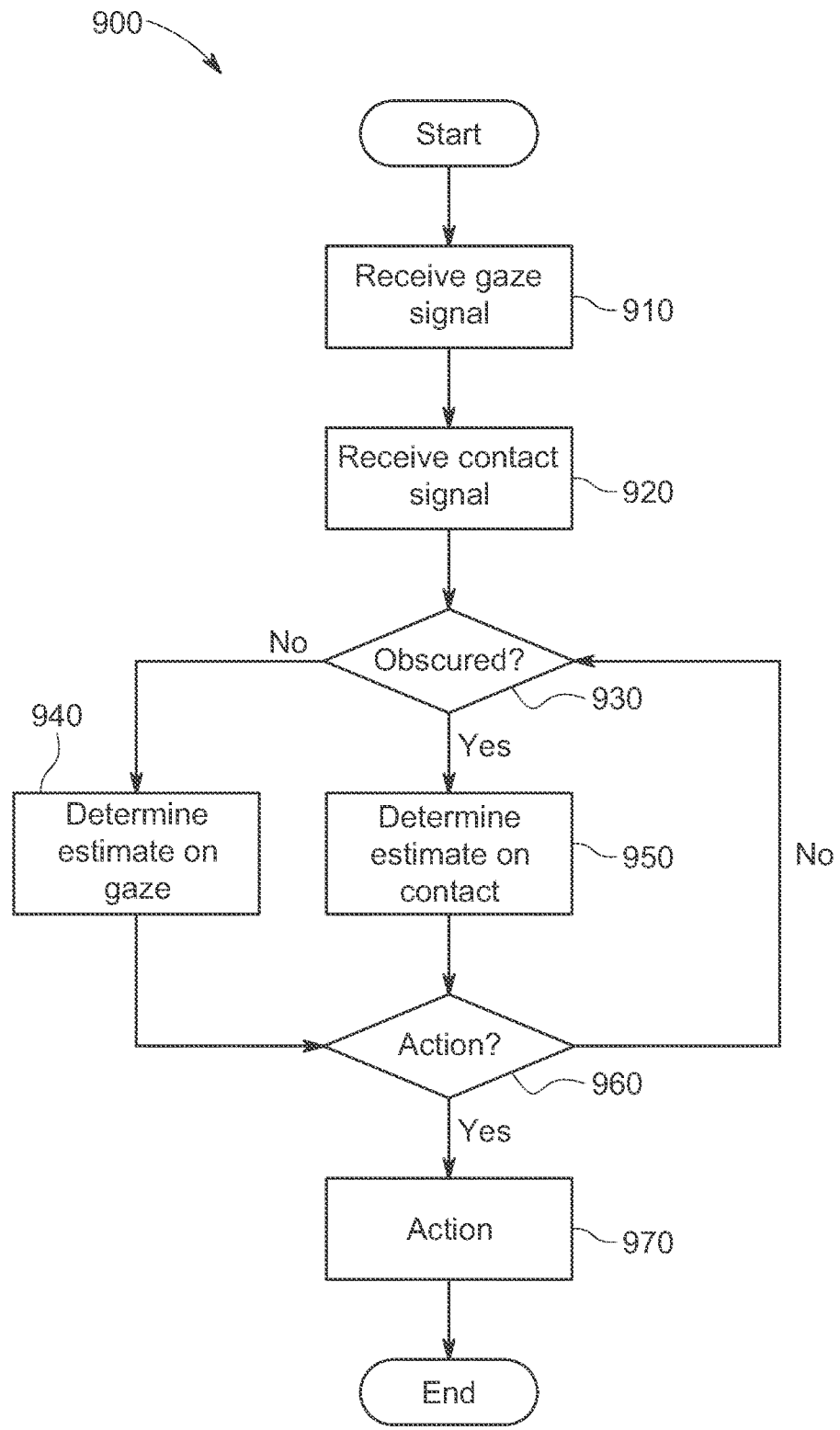
FIG. 9 illustrates a method according to another embodiment of the invention.

FIG. 9 illustrates a method 900 according to a further embodiment of the invention. The method 900 may be an attention warning method 900 according to an embodiment of the invention. The method 900 may be implemented by the control system 210, in particular by the AM 280 operably supported thereon. The method 900 may cause output of one or both of the notification signal 213 and the control signal 215 by the controller 210 under control of the AM 280. The method 900 may be implemented continuously by the AM 280 whilst the vehicle is operational in the autonomous mode i.e. the method is started once the vehicle operates in the autonomous mode.

The method 900 may comprise a step of receiving 910 a gaze signal 211 indicative of a direction of a gaze of an occupant of a vehicle. The gaze signal 211 may be being determined in dependence on image data which relates to at least a portion of the occupant. The image data being output by at least one imaging means 150, 220 such as a camera 150 as described above. The method 900 comprises receiving 920 a contact signal 212 indicative of physical contact between the occupant and a control of the vehicle.

In step 930 it is determined whether the occupant is at least partly obscured relative to the at least one imaging means 150, 220. If the occupant is obscured, the method 900 moves to step 950. If, however, the occupant is unobscured, the method moves to step 940.

In a step 940, an estimate of the occupant's attention to a driving task is determined in dependence on the gaze signal 211.

In step 950, the estimate of the occupant's attention to the driving task is determined in dependence on the contact signal 212.

Step 960 comprises determining whether it is necessary to take an action in dependence on the estimate of the occupant's attention to the driving task. The determination may also be made dependent upon one or more predetermined threshold values, as described above such as in relation to FIGS. 4-6. In step 970 one or more actions are initiated in dependence on the estimate of the occupant's attention to the driving task which may comprise outputting one or more signals 213, 215 from the controller 210.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A control system for a vehicle, the control system comprising one or more controllers, the control system being configured to:
   receive a gaze signal indicative of a direction of a gaze of an occupant of a vehicle, wherein said gaze signal is indicative of an occupant's gaze being directed to a primary driving region, PDR, a secondary driving region, SDR, or a non-driving region, NDR;
   determine an attention value indicative of an estimate of the occupant's attention to a driving task, wherein said attention value is changed in a first direction in dependence on the gaze signal being indicative of the occupant's gaze being directed to the PDR, said attention value is changed in a second direction at a first rate in dependence on the gaze signal being indicative of the occupant's gaze being directed to the SDR and said attention value is changed in the second direction at a second rate in dependence on the gaze signal being indicative of the occupant's gaze being directed to the NDR; and
   output a signal to cause one or more actions to be performed in dependence on the attention value being equal to or exceeding a predetermined threshold value.

2. The control system of claim 1, wherein the control system being configured to determine the attention value indicative of the estimate of the occupant's attention to the driving task comprises the control system being arranged to determine a gaze-duration measure indicative of a duration of time for which the occupant's gaze is directed to the primary driving region, the secondary driving region and the non-driving region respectively.

3. The control system of claim 2, wherein the gaze signal is determined in dependence on image data relating to at least a portion of the occupant, the image data being output by at least one imaging means, and the control system is configured to suspend updating of the gaze-duration measure when the occupant is at least partly obscured relative to the at least one imaging means.

4. The control system of claim 2, configured to output the signal when the gaze-duration measure reaches the predetermined threshold.

5. The control system of claim 2, configured to update the gaze-duration measure in a first direction in dependence on the gaze signal being indicative of a driver's gaze being directed to the PDR, update the gaze-duration measure in a second direction at a first rate in dependence on the gaze signal being indicative of the driver's gaze being directed to the SDR, and to update the gaze-duration measure in the second direction at a second rate in dependence on the gaze signal being indicative of the driver's gaze being directed to the NDR.

6. The control system of claim 5, wherein the second rate for updating the gaze-duration measure is greater than the first rate for updating the gaze-duration measure.

7. The control system of claim 2, wherein the control system being configured to determine the estimate of the occupant's attention to the driving task in dependence on the gaze signal comprises the control system being configured to determine a gaze-distance measure indicative of a distance of travel ahead of the vehicle to which the occupant is deemed attentive.

8. The control system of claim 7, configured to update the gaze-distance measure indicative of the occupant's gaze being directed to a driving region and the non-driving region, respectively, said updating being in dependence on a velocity of the vehicle.

9. The control system of claim 8, configured to update the gaze-distance measure in dependence on the velocity of the vehicle and a predetermined gain value.

10. The control system of claim 7, configured to update the gaze-distance measure in a first direction in dependence on the gaze signal being indicative of a driver's gaze being directed to the PDR, for a predetermined period of time, to update the gaze-distance measure in a second direction in dependence on the gaze signal being indicative of the driver's gaze being directed to one of the SDR, or the NDR for a predetermined period of time.

11. The control system of claim 7, wherein the control system is configured to output the signal in dependence both the gaze-duration measure and the gaze distance measure reaching respective predetermined thresholds.

12. The control system of claim 1, wherein the determining the attention value indicative of the estimate of the occupant's attention to the driving task comprises the control system being configured to determine a contact value at least partly representing the estimate of a driver's attention to the driving task and to update the contact value in dependence on a contact signal.

13. The control system of claim 12, wherein:
the control system being configured to determine the attention value indicative of the estimate of the occupant's attention to the driving task comprises the control system being arranged to determine a gaze-duration measure indicative of a duration of time for which the occupant's gaze is directed to the primary driving region, the secondary driving region and the non-driving region respectively;
the control system being configured to determine the estimate of the occupant's attention to the driving task in dependence on the gaze signal comprises the control system being configured to determine a gaze-distance measure indicative of a distance of travel ahead of the vehicle to which the occupant is deemed attentive; and the control system is configured to output the signal in dependence on both the gaze-duration measure and the contact value.

14. The control system of claim 1, configured to update the attention value indicative of the estimate of a driver's attention to the driving task at periodic intervals.

15. The control system of claim 1, configured to:
output a suspend signal to initiate an at least partial suspension of operation of the vehicle in an autonomous mode in dependence on the estimate of the occupant's attention to the driving task and the predetermined threshold value, and
output a resume signal to resume operation of the vehicle in the autonomous mode dependence on a contact signal being indicative of physical contact between a driver and the control of the vehicle.

16. The control system of claim 12, configured to update the contact value in a first direction in dependence on the contact signal being indicative of physical contact between the driver and the control of the vehicle and to update the contact value in a second direction in dependence on the contact signal being indicative of an absence of physical contact between the driver and the control of the vehicle.

17. The control system of claim 1, wherein the one or more controllers collectively comprise:
at least one electronic processor having an electrical input for receiving the gaze signal and a contact signal; and
at least one electronic memory device operatively coupled to the at least one electronic processor and having instructions stored therein;
and wherein the at least one electronic processor is configured to access the at least one memory device and execute the instructions thereon so as to cause the at least one electronic processor to:
determine the estimate of the occupant's attention to a driving task in an at least partly autonomous mode in dependence on the gaze signal, and output the signal for initiating the one or more actions; or
determine an attention value indicative of an estimate of the occupant's attention to a driving task and output the signal to cause the one or more actions to be performed in dependence on the attention value being equal to or exceeding the predetermined threshold value.

18. The control system of claim 1 comprised in a vehicle.

19. A method for a vehicle operable in an at least partly autonomous mode and a manual mode, the method comprising:
receiving a gaze signal indicative of a direction of a gaze of an occupant of a vehicle, wherein said gaze signal is indicative of an occupant's gaze being directed to a primary driving region, PDR, a secondary driving region, SDR, or a non-driving region, NDR;
determining an attention value indicative of an estimate of the occupant's attention to a driving task, wherein said attention value is changed in a first direction in dependence on the gaze signal being indicative of the occupant's gaze being directed to the PDR, said attention value is changed in a second direction at a first rate in dependence on the gaze signal being indicative of the occupant's gaze being directed to the SDR and said attention value is changed in the second direction at a second rate in dependence on the gaze signal being indicative of the occupant's gaze being directed to the NDR; and output a signal to cause one or more actions to be performed in dependence on the attention value being equal to or exceeding a predetermined threshold value.

20. A non-transitory, computer-readable storage medium storing instructions thereon that, when executed by one or more electronic processors, causes the one or more electronic processors to carry out the method of claim 19.

\* \* \* \* \*